(12) United States Patent
Laemmle et al.

(10) Patent No.: US 12,230,971 B2
(45) Date of Patent: Feb. 18, 2025

(54) ELECTROMAGNETIC INDUCTION CHARGING DEVICE

(71) Applicant: MAHLE International GmbH, Stuttgart (DE)

(72) Inventors: Christopher Laemmle, Stuttgart (DE); Holger Schroth, Maulbronn (DE)

(73) Assignee: Mahle International GmbH, Stuttgart (DE)

( * ) Notice: Subject to any disclaimer, the term of this patent is extended or adjusted under 35 U.S.C. 154(b) by 600 days.

(21) Appl. No.: 17/539,093

(22) Filed: Nov. 30, 2021

(65) Prior Publication Data

US 2022/0173613 A1 Jun. 2, 2022

(30) Foreign Application Priority Data

Nov. 30, 2020 (DE) ...................... 10 2020 215 074.5

(51) Int. Cl.
*H02J 50/00* (2016.01)
*B60L 53/12* (2019.01)
(Continued)

(52) U.S. Cl.
CPC ............ *H02J 50/005* (2020.01); *B60L 53/12* (2019.02); *H01F 27/025* (2013.01); *H01F 27/08* (2013.01); *H01F 38/14* (2013.01); *H02J 50/10* (2016.02)

(58) Field of Classification Search
CPC ......... Y02T 10/70; Y02T 90/12; Y02T 10/72; Y02T 90/14; Y02T 10/7072; B60L 53/12;
(Continued)

(56) References Cited

U.S. PATENT DOCUMENTS 8,946,938 B2 * 2/2015 Kesler .................. H02J 50/80
307/104
9,496,721 B2 * 11/2016 Kobayashi ............ H01G 11/10
(Continued)

FOREIGN PATENT DOCUMENTS

CN 204204611 U 3/2015
CN 207234482 U 4/2018
(Continued)

OTHER PUBLICATIONS

Office Action dated Feb. 8, 2024, issued in Chinese counterpart application No. 202111454447.2 and English-language translations thereof.
(Continued)

*Primary Examiner* — Michael A Matey
(74) *Attorney, Agent, or Firm* — Ewers IP Law PLLC; Falk Ewers

(57) ABSTRACT

An electromagnetic induction charging device for an inductive, in particular contactless, charging of an at least partially electrified motor vehicle with electrical energy, with a housing, formed in a pot-like manner, which comprises a pot base and a pot collar, wherein the pot collar facing away from the pot base surrounds a pot opening, and with a thermally conductive cover which covers the pot opening and with an electromagnetic resonator arranged in the housing interior, wherein the housing includes a thermal insulation which is arranged at the pot collar and at the pot base for the thermal insulating of the housing interior with respect to the external environment.

18 Claims, 3 Drawing Sheets

(51) Int. Cl.
  *H01F 27/02* (2006.01)
  *H01F 27/08* (2006.01)
  *H01F 38/14* (2006.01)
  *H02J 50/10* (2016.01)

(58) Field of Classification Search
  CPC .. B60L 53/302; B60L 2240/36; B60L 53/126;
    B60L 50/64; H01F 38/14; H01F 27/025;
    H01F 27/08; H01F 27/22; H01F 27/02;
    H01F 27/363; H01F 27/2876; H01F
    27/32; H02J 50/10; H02J 50/005; H02J
    2310/48; H02J 50/12; H02J 7/00045;
    H05K 7/20945; B60M 7/003; B60Y
    2200/91; B60Y 2200/92; H04B 5/24;
    Y04S 10/126
  See application file for complete search history.

(56) References Cited

U.S. PATENT DOCUMENTS

| | | | | |
|---|---|---|---|---|
| 2015/0091511 A1* | 4/2015 | Ichikawa | ................ | H02J 50/12 320/108 |
| 2015/0123465 A1* | 5/2015 | Ichikawa | ................ | H01F 38/14 307/9.1 |
| 2015/0130288 A1 | 5/2015 | Ichikawa | | |
| 2017/0001527 A1* | 1/2017 | Prokhorov | ............ | B60L 53/126 |
| 2017/0338023 A1* | 11/2017 | Ansari | .................. | H01F 27/363 |
| 2018/0272876 A1* | 9/2018 | Koenig | .................. | B60L 53/39 |
| 2019/0006826 A1* | 1/2019 | Islinger | ................ | H02G 3/0418 |
| 2019/0140478 A1* | 5/2019 | Furukawa | ................ | H01G 4/38 |
| 2020/0139829 A1* | 5/2020 | Laemmle | .............. | H02J 50/005 |
| 2020/0143978 A1* | 5/2020 | Laemmle | .............. | H01F 27/025 |
| 2021/0195811 A1* | 6/2021 | Wiebelt | .................. | B60L 53/12 |
| 2022/0103012 A1* | 3/2022 | Himmer | .................. | H01F 38/14 |

FOREIGN PATENT DOCUMENTS

| | | |
|---|---|---|
| CN | 109599917 A | 4/2019 |
| DE | 102012011606 A1 | 12/2013 |
| KR | 101727465 B1 | 4/2017 |
| KR | 101879656 B1 | 7/2018 |

OTHER PUBLICATIONS

Search Report dated Feb. 6, 2024, issued in Chinese counterpart application No. 202111454447.2 and English-language translations thereof.

* cited by examiner

ELECTROMAGNETIC INDUCTION CHARGING DEVICE

CROSS REFERENCE TO RELATED APPLICATIONS

This application claims priority to German patent application DE 10 2020 215 074.5, filed Nov. 30, 2020, the entire content of which is incorporated herein by reference.

TECHNICAL FIELD

The disclosure relates to an electromagnetic induction charging device for the inductive, in particular contactless, charging of an at least partially electrified motor vehicle with electrical energy.

BACKGROUND

For the wireless and contactless charging of at least partially electrified motor vehicles, which usually comprise an electrical energy storage device for the storing of electrical energy, which is fed to the vehicle during charging, usually the principle of electromagnetic induction is used. Here, for the wireless charging of such motor vehicles, electromagnetic induction charging devices with at least one electromagnetic (transmitter) coil are used, with which an electric current can be induced in at least one electromagnetic (receiver) coil which is present in the motor vehicle and is electrically connected to the electrical energy storage device. The electrical energy storage device of the motor vehicle can be a traction battery, which serves for supplying an electric drive of the motor vehicle with electrical energy. An "at least partially electrified" motor vehicle uses at least electricity as energy carrier for its drive, but can also use, in addition, further energy carriers, so that the term expressly includes both pure electric vehicles and also hybrid vehicles. In a typical arrangement for the wireless charging of at least partially electrified motor vehicles, the electromagnetic induction charging device is mounted on a substrate, so that the motor vehicle which is to be charged inductively can travel with its underbody, on which the electromagnetic receiver coil is present, over the electromagnetic induction charging device. Such electromagnetic induction charging devices, as they are arranged on the substrate, are also designated as "ground assemblies". In such ground assemblies, an outer surface of the induction charging device, facing away from the substrate, usually lies exposed.

In the operation of such an electromagnetic induction charging device, i.e., in the inductive transmission of electrical energy between motor vehicle and induction charging device, the induction charging device typically generates waste heat. In conventional induction charging devices, this waste heat leads disadvantageously to the exposed outer face of the induction charging device being able to be heated to a surface temperature of more than 60° C. Such a hot surface, however, poses a high risk of injury if a person— intentionally or unintentionally—comes in contact with it.

SUMMARY

It is therefore an object of the present disclosure—in particular for the elimination of the disadvantage indicated above—to indicate new ways for electromagnetic induction charging devices for the inductive charging of an at least partially electrified motor vehicle with electrical energy.

This object is achieved by the electromagnetic induction charging device described herein. Accordingly, a general idea of the disclosure is to equip a housing of an electromagnetic induction charging device with a thermal insulation, with which a housing interior, partially delimited by the housing, is thermally insulated in the region of the housing. An opening of the housing is closed with a thermally conductive cover, for cooling an electromagnetic resonator which is received in the housing interior, so that the cover, together with the housing, delimits the housing interior in a fluid-tight manner. With the thermal insulation of the housing, the heat transmission between housing interior and an environment externally surrounding the electromagnetic induction charging device is focused on the cover, so that the waste heat occurring in operation of the induction charging device is emitted to the environment at least largely with the cover.

Conversely, this means that advantageously a heat input into the housing and thus a surface temperature of the exposed outer surface of the housing can be reduced compared to a conventional electromagnetic induction charging device.

An electromagnetic induction charging device according to the disclosure serves for the inductive, in particular contactless, charging with electrical energy of an at least partially electrified motor vehicle. Conversely, however, electrical energy can also be transmitted from the motor vehicle to the electromagnetic induction charging device and can be fed into an external power network with the electromagnetic induction charging device, so that the motor vehicle or respectively its energy storage device can be used as a buffer for the external power network. The electromagnetic induction charging device can therefore be set up for the bidirectional transmission of electrical energy between motor vehicle and electromagnetic induction charging device. The electromagnetic induction charging device comprises a housing formed in a pot-like manner, which has a pot base and a pot collar, wherein the pot collar, facing away from the pot base, surrounds a pot opening. It shall be understood that the term "pot base" does not establish any position thereof with respect to a gravity direction. The electromagnetic induction charging device further comprises a thermally conductive cover which covers the pot opening. In addition, the electromagnetic induction charging device comprises an electromagnetic resonator, arranged in the housing interior, for the inductive transmitting of electrical energy to the motor vehicle. Here, the housing has a thermal insulation which is arranged at the pot collar and at the pot base for the thermal insulation of the housing interior with respect to the external environment. With this thermal insulation, the housing interior can be thermally insulated on the housing side from the external environment so that a heat transmission between the housing interior and the environment is focused on the, typically insulation-free, cover. Advantageously, it is thus achieved that waste heat occurring in operation of the electromagnetic induction charging device is largely, typically for the most part, emitted via the cover to the external environment, so that, conversely, it can be reliably ensured that a surface temperature of the exposed outer surface of the housing can be kept low, in particular below 60° C. The risk of injury originating from the electromagnetic charging device is thus advantageously reduced, if not even entirely eliminated.

In a further exemplary embodiment of the electromagnetic induction charging device, the cover closes the pot opening in a fluid-tight manner. In so doing, the cover forms a heat bridge which connects the housing interior thermally with the external environment. A particularly large proportion of the waste heat occurring in operation of the electromagnetic induction charging device can thus be dissipated out of the housing interior via the heat bridge.

Expediently, the cover of the electromagnetic induction charging device is formed as a cooling plate. Such a cover, formed as a cooling plate, enables a particularly effective heat dissipation of the waste heat from the housing interior. At the same time, such a cooling plate is particularly flat in structure, so that the electromagnetic induction charging device as a whole can be realized with a small overall height.

According to a further exemplary embodiment of the electromagnetic induction charging device, the thermal insulation is arranged on an inner side of the housing facing the housing interior. The thermal insulation is therefore facing away from the external environment, so that it can be effectively protected from environmental in-fluences with a, typically hard, outer shell of the housing. In particular, the thermal insulation can thus be protected from the mechanical load which the electromagnetic induction charging device undergoes when the electromagnetic induction charging device is travelled over by a motor vehicle.

In another advantageous further development of the electromagnetic induction charging device, the thermal insulation is arranged on an outer side of the housing facing the external environment. This has the advantage that a reduction of the volume of the housing interior is avoided, such as results when the thermal insulation is provided on the housing, facing the housing interior.

According to an exemplary embodiment of the induction charging device, the thermal insulation is formed as an insulation layer with layer thickness of 1 mm to 5 mm. This insulation layer encloses the housing or/and lines the housing. Such a thermal insulation formed as an insulation layer offers an optimum ratio between an insulation material expenditure occurring for the formation of the insulation layer and the thermally insulating effect which is able to be achieved with the insulation layer.

In a further exemplary embodiment of the electromagnetic induction charging device, provision is made that the housing comprises a housing inner skin and a housing outer skin, between which the insulation is arranged in a sandwich-like manner. Such a housing proves to be particularly robust.

In a further exemplary embodiment of the electromagnetic induction charging device, the thermal conductivity of the thermal insulation is a maximum of 0.04 W/(m*K). Alternatively or additionally, the thermal conductivity of the cover is at least 20 W/(m*K), typically at least 100 W/(m*K). This permits the desirable pre-dominant dissipation of the waste heat from the housing interior via the cover.

According to a further exemplary embodiment of the electromagnetic induction charging device, the thermal insulation comprises an electrically insulating insulation material or consists of such an electrically insulating insulation material. The thermal insulation can therefore be, at the same time, an electrical insulation. Typically, the insulation material is glass wool, rock wool, foam glass, calcium silicate, expanded clay, perlite or a combination thereof. Alternatively or additionally, the cover comprises an electrically conductive cover material or consists of such an electrically conductive cover material. Typically, the cover material is aluminum, copper, steel or a combination thereof. Thus, in an advantageous manner, both an electrical earthing and also a magnetic shielding of the electromagnetic induction charging device can be realized with the cover in a manner which is able to be implemented technically particularly simply.

In a further exemplary embodiment of the electromagnetic induction charging device, the housing interior is able to be flowed through by an operating medium so that, through convention, heat is able to be transmitted from the resonator to the cover. Expediently, the housing interior is configured so that the working medium can circulate in it to bring about the convention heat transmission. This improves the transmission to the cover of the waste heat, occurring in operation of the electromagnetic induction charging device on the resonator.

A further exemplary embodiment of the electromagnetic induction charging device makes provision that the housing interior for the transport of heat from resonator via the cover into the external environment forms a closed circulation path partially delimited by the resonator, along which the operating medium circulates or can circulate. Thus, owing to convection, a particularly effective heat transmission can be achieved from the resonator to the operating medium.

Expediently, the resonator is arranged in the circulation path so that it is entirely surrounded by the latter. Advantageously, the resonator is therefore flowed around by operating medium in the circulation path on all sides, which enables a still more effective heat transmission between resonator and operating medium.

According to a further exemplary embodiment of the electromagnetic induction charging device, a conveying device is present in the housing interior, with which the circulation of the operating medium is able to be brought about. Thus, from the natural convection a forced convection comes about, whereby the discharging of the waste heat is still further improved.

A further exemplary embodiment of the electromagnetic induction charging device makes provision that in the housing interior at least a first cooling channel is present, able to be flowed through by the operating medium or by a secondary operating medium different from the operating medium, which first cooling channel is coupled thermally to the resonator for heat transmission between resonator and operating medium or secondary operating medium. Alternatively or additionally, a second cooling channel is present, able to be flowed through by the operating medium or by the secondary operating medium, which second cooling channel can communicate with the first cooling channel. Typically, the two cooling channels form a circuit in which the operating medium or the secondary operating medium can flow around the resonator. Thus, a particularly large amount of heat can be dissipated from the housing interior.

In a further exemplary embodiment of the electromagnetic induction charging device, the operating medium is a gas, in particular air. Alternatively, the operating medium or the secondary operating medium is an in particular dielectric or electrically conductive liquid. In a further alternative, the operating medium is a gas and the secondary operating medium is an in particular dielectric or electrically conductive liquid. With a liquid operating medium, the housing interior or respectively the resonator arranged therein can be cooled particularly well, wherein, however, the components directing the liquid operating medium must be extensively sealed. In contrast, a gaseous medium indeed permits a smaller cooling capacity, wherein however—especially when air is used as operating medium—the operating medium which is heated as a result of the heat absorption can be directed in to the environment in a manner which is easy to implement, together with the heat which is to be dissipated.

According to a further exemplary embodiment of the electromagnetic induction charging device, the electromagnetic induction charging device comprises power electronics which are arranged typically outside the housing interior or partially in the housing interior, most typically entirely outside or entirely inside the housing interior. Advantageously, the power electronics can therefore be integrated in the induction charging device. The power electronics can be protected here from environmental influences with the housing of the induction charging device and can be cooled with the cover of the induction charging device.

According to a further exemplary embodiment of the electromagnetic induction charging device, the cover comprises a network of cavities which are suitable for directing the secondary operating medium or respectively for circulating the latter within the cover. Thereby, it is prevented that the cover heats up in an in-admissible manner. In an advantageous embodiment, the secondary operating medium is a liquid, in particular a water-based liquid, typically an antifreeze-water solution. Through a high specific heat capacity of the liquid, it is possible in a particularly simple manner to realize the discharging of the heat, which is transmitted to the cover by the first operating medium out of the resonator within a small installation space of the network of the cavities, out from the cover. The network of the cavities is present within the cover. The network of the cavities within the cover is typically connected to a conveying device, which makes it possible to circulate the secondary operating medium in the network of the cavities.

In a further exemplary embodiment of the electromagnetic induction charging device, the electromagnetic induction charging device comprises a recooler, which is typically arranged outside or at least partially in the housing interior, most typically entirely outside or entirely inside the housing interior. Advantageously, with the recooler, heat can be emitted particularly effectively out from the operating medium or from the secondary operating medium to the external environment, in particular when the operating medium circulates in a closed cooling circuit.

According to a further exemplary embodiment of the electromagnetic induction charging device, provision is made that the housing comprises a partition wall which divides the housing interior into a first and into a second compartment. Here, in the first compartment the resonator, and in the second compartment the power electronics or/and the recooler is/are arranged. Such a partition wall has an advantageously reinforcing effect on the housing.

According to a further exemplary embodiment of the electromagnetic induction charging device, the electromagnetic resonator comprises an electromagnetic coil which is typically wound substantially in a flat or respectively planar manner in a horizontal, and a magnetic field conductor, typically of ferrite. Such a resonator enables a particularly effective inductive transmission of electrical energy.

In a further exemplary embodiment of the electromagnetic induction charging device, the thermal insulation fills the housing interior entirely, so that the remaining components which are arranged in the housing interior are embedded in the thermal insulation. Said components can thus be fixed in the housing interior advantageously with the insulation in a manner which can be implemented technically particularly simply.

According to a further exemplary embodiment of the electromagnetic induction charging device, the electromagnetic induction charging device is set up for mounting on a substrate which is able to be travelled on by the motor vehicle which is to be charged. Here, in operating position of the induction charging device, the cover is arranged, in the direction of gravity, beneath the housing, and the induction charging device touches the substrate, typically exclusively, with the cover. Such an induction charging device permits a particularly precise positioning of the motor vehicle, which is to be charged, relative to the induction charging device.

Further important features and advantages of the disclosure will emerge from the drawings and from the associated figure description with the aid of the drawings.

It shall be understood that the features mentioned above and to be explained further below can be used not only in the respectively indicated combination, but also in other combinations or in isolation, without departing from the scope of the present disclosure.

Exemplary embodiments of the disclosure are illustrated in the drawings and are explained more closely in the following description, wherein the same reference numbers refer to identical or similar or functionally identical components.

BRIEF DESCRIPTION OF THE DRAWINGS

The disclosure will now be described with reference to the drawings wherein.

DESCRIPTION OF EXEMPLARY EMBODIMENTS

Figure 1:
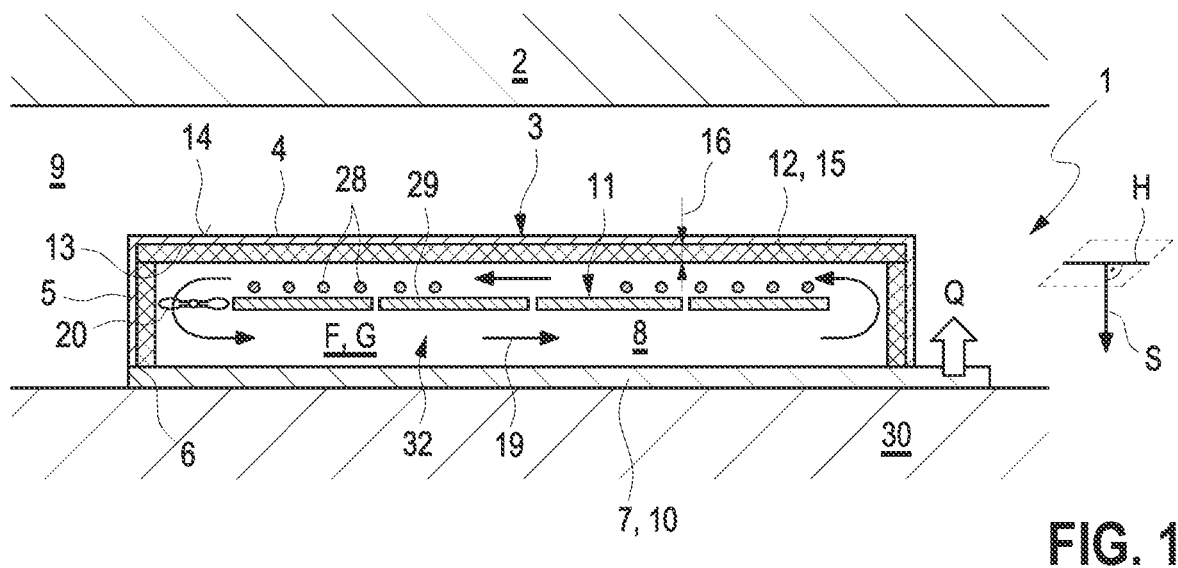
FIGS. 1 to 9 in each case an example, illustrated perpendicularly in section, of an electromagnetic induction charging device according to the disclosure, in an operating position.

FIG. 1 illustrates an electromagnetic induction charging device 1 according to an exemplary embodiment of the disclosure in an operating position, in a section along a gravity direction S. It shall be understood that the induction charging device 1 according to the disclosure can also be operated in another position, different from the operating position which is shown. The electromagnetic induction charging device 1 serves for the inductive charging of an at least partially electrified motor vehicle 2 with electrical energy. With the induction charging device 1, such an at least partially electrified motor vehicle 2 can be charged inductively with electrical energy in a wireless, in the exemplary embodiment which is shown contactless, manner. For this, the motor vehicle 2 can comprise an electrical energy storage device, in which the electrical energy can be stored after or respectively during the inductive charging. This energy storage device can be, for example, a traction battery for supplying an electric drive of the motor vehicle 2 with electrical energy. Conversely, the electromagnetic induction charging device 1 can also be set up for the inductive receiving of electrical energy, for example in order to use the electrical energy storage device of the motor vehicle 2 as a buffer store for an electrical power network which is external with respect to the motor vehicle 2.

It can be seen in FIG. 1 that the electromagnetic induction charging device 1 comprises a housing 3 which is formed in a pot-like manner. The housing 3 can have the form of a trough. The housing 3 comprises a pot base 4 and a pot collar 5, which projects for example in an angled manner from the pot base 4. The pot collar 5 surrounds a pot opening 6 in a manner facing away from the pot base 4. The pot base 4 can be formed in a flat manner and can have an angular, for example rectangular, or rounded shape. The electromagnetic induction charging device 1 comprises, in addition, a thermally conductive cover 7, which lies on the pot collar 5 so that it covers the pot opening 6. In so doing, the cover 7 covers the pot opening 6 in such a way that the cover 7, together with the housing 3, fluidically separates a housing interior 8 from an external environment 9. The cover 7 therefore closes the pot opening 6 in a fluid-tight manner. The external environment 9 surrounds the electromagnetic induction charging device 1. The cover 7 forms, for example, a heat bridge 10, which thermally couples the housing interior 8 and the external environment 9 to one another, so that the housing interior 8 and the external environment 9 are thermally connected to one another with the cover 7. The cover 7 is, for example, formed as a cooling plate.

FIG. 1 shows in addition that an electromagnetic resonator 11 for the inductive transmitting of electrical energy to the motor vehicle 2 is arranged in the housing interior 8. In the exemplary embodiment, the electromagnetic resonator 11 is thermally coupled, for its cooling, to the cover 7. The housing 3 comprises a thermal insulation 12. For the thermal insulating of the housing interior 8 with respect to the outer side 14 of the housing 3, facing the external environment 9, the thermal insulation 12 is arranged at the pot collar 4 and at the pot base 5. The temperature on the outer side 14 can thereby be decoupled from the temperature in the interior 8 and can thus correspond to the greatest possible extent to the temperature of the environment 9. In the exemplary embodiment which is shown, the insulation 12 lies against the pot collar 4 and against the pot base 5. The thermal insulation 12 insulates the housing interior 8 on the housing side from the external environment 9. Here, the thermal insulation 12 insulates the housing interior from the external environment 9 in such a way that it can focus a heat transmission between the housing interior 8 and the environment 9 to the heat bridge 10. A primary heat transmission path of the electromagnetic induction charging device 1, which a heat flow Q—follows, therefore runs immediately, i.e. directly, from the cover 7 to the environment 9. The cover 7 can consequently form a heat sink of the induction charging device 1.

The thermal insulation 12 comprises for example an insulation material which contains no metallic or electrically conductive contents. The insulation material is therefore, for example, electrically insulating. The insulation material of the thermal insulation 12 can be fire retardant. The insulation material of the thermal insulation 12 can be glass wool, rock wool, foam glass, calcium silicate, expanded clay, perlite or a combination thereof. The insulation material can have the form of a semi-finished product. Such a semi-finished product can be a plate, a mat, a pourable material packing or a loose fill. Such a semi-finished product can have honeycomb structure. The semi-finished product can be adapted to the structural and mechanical conditions at the installation site for the formation of the thermal insulation 12 of the electromagnetic induction charging device 1, for example with milling, recesses or reinforcements. The insulation material can be porous. The insulation material can be a foam material. The insulation material can have a low thermal conductivity which is, for example, less than 0.04 W/(m*K). The thermal insulation 12 can have a thermal resistance which is larger than 0.2 mm2*K/W. The housing 3 can—without considering insulation 12—be formed from plastic.

Figure 2:
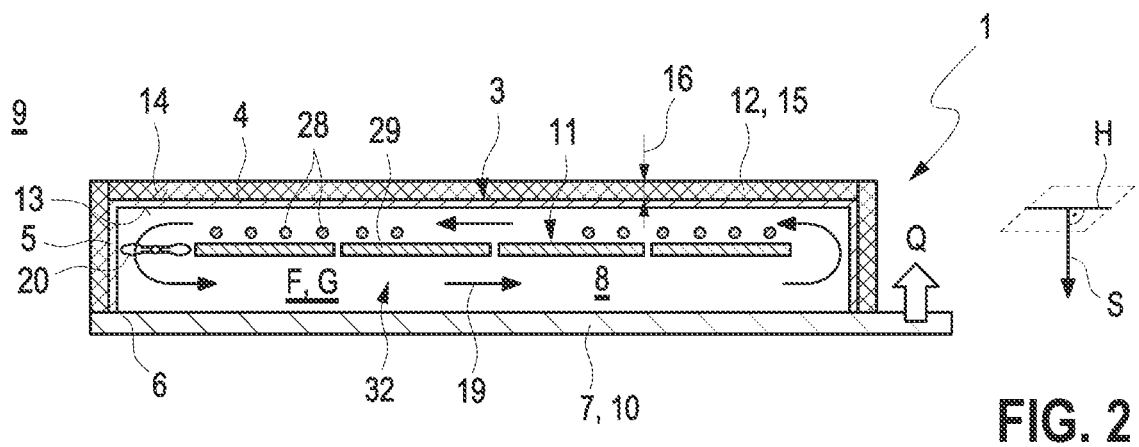

According to the exemplary embodiment shown in FIG. 1, the thermal insulation 12 is arranged on an inner side 13 of the housing 3 facing the housing interior 8. In FIG. 2, a further exemplary embodiment of an induction charging device 1 according to the disclosure is shown in a section along the gravity direction S. Contrary to the exemplary embodiment shown in FIG. 1, in the exemplary embodiment shown in FIG. 2 the thermal insulation 12 is arranged on an outer side 14 of the housing 3 facing the external environment 9.

According to FIGS. 1 and 2, the thermal insulation 12 is formed for example as insulation layer 15. The insulation layer 15 has, for example, a layer thickness 16 of 1 millimeter to 5 millimeters, wherein the layer thickness 16 is established by a minimum extent of the insulation layer 15 measured between housing interior 8 and environment 9. In the exemplary embodiment shown in FIG. 2, the insulation layer 15 encloses the housing 3. In the exemplary embodiment shown in FIG. 1, the insulation layer 15 lines the housing 3. The insulation layer 15 can enclose or respectively line the housing 3 over the entire surface, therefore can substantially completely cover the outer side 14 or respectively the inner side 13 of the housing.

Figure 3:
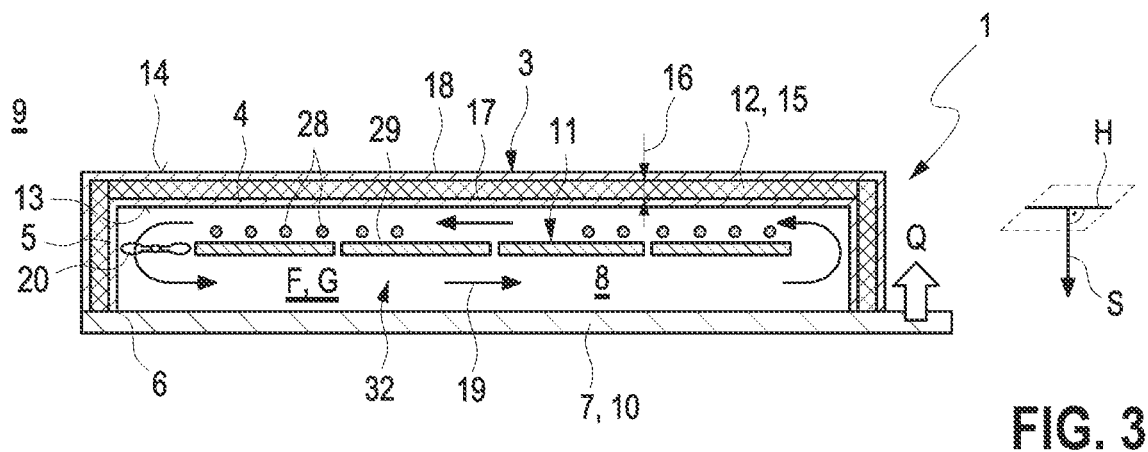

FIG. 3 illustrates a further exemplary embodiment shown of an induction charging device 1 according to the disclosure, likewise in section along the gravity direction S. Accordingly, the housing 3 has, for example, a housing inner skin 17 and a housing outer skin 18. Between the housing inner skin 17 and the housing outer skin 18, the insulation 2 is arranged in a sandwich-like manner. The insulation 2 can therefore be the core of a sandwich body of the housing 3 comprising the housing inner skin 17, the housing outer skin 18 and the insulation 2. The housing outer skin 18 can be formed in the manner of a housing jacket.

FIGS. 1 to 3 further show that the housing interior 8 can be flowed through by an operating medium F, so that heat is able to be transmitted from the resonator 11 to the cover 7 with convention via the circulating operating medium F. The waste heat which is generated by the resonator 11 in operation can therefore be transmitted firstly to the operating medium F and discharged with the convention from the resonator 11 and fed to the cover 7, before the waste heat is emitted to the external environment 9 with the cover 7. Here, for example, a conveying device 20 is present in the housing interior 8, with which the circulation 19 of the operating medium F can be brought about. The circulation 19 which is thus brought about leads to a so-called forced convection, which further distinctly improves the heat transmission between resonator 11 and the operating medium F. In the examples which are shown, this conveying device 20 is realized as a fan. For the transport of heat from the resonator 11 via the cover 7 into the external environment 9, the housing interior 8 forms a closed circulation path 32 which is partially delimited by the resonator 11. The operating medium F circulates along this circulation path 32. Here, in the exemplary embodiment shown in FIGS. 1 to 3, the resonator 11 is arranged in the circulation path 32 so that it is entirely surrounded thereby. The circulation 19 can be brought about with the conveying device 20.

Figure 8:
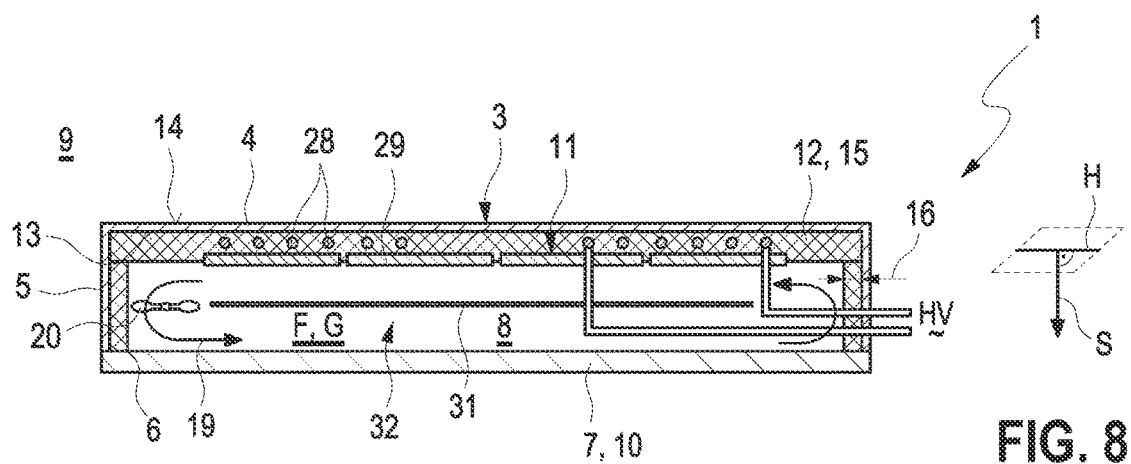

In FIG. 8, a further exemplary embodiment of an electromagnetic induction charging device 1 according to the disclosure is shown in a section along the gravity direction S. It can be seen that in the housing interior 8 a flow-directing element 31 is present, which influences the circulation 19 of the operating medium F.

Figure 9:
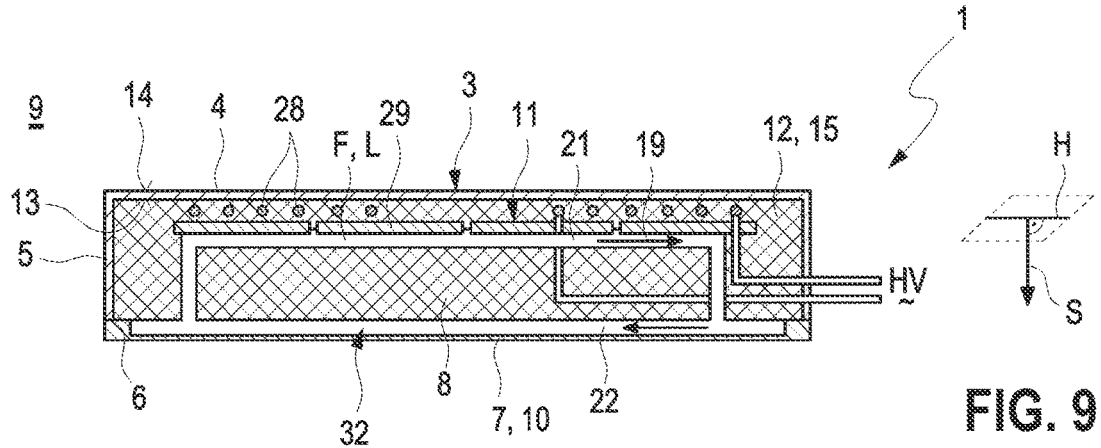

FIG. 9 shows a further exemplary embodiment of an electromagnetic induction charging device 1 according to the disclosure, which is illustrated in a section along the gravity direction S. In accordance with this exemplary embodiment, at least a first cooling channel 21, which can be flowed through by the operating medium F, is present in the housing interior 8. For the transmission of heat between resonator 11 and operating medium F, the first cooling channel 21 is coupled thermally to the resonator 11. In the cover 7, a second cooling channel 22, able to be flowed through by the operating medium F, is present, which communicates fluidically with the first cooling channel 21. The operating medium F can circulate via the first and the second cooling channel 21, 22. The second and the first cooling channel 21, 22 can therefore be comprised by a cooling circuit.

The operating medium F is, for example, a gas G, which can be air. Alternatively, the operating medium F is, for example, a liquid L, which can be dielectric or conductive. Thus in the examples of FIGS. 1 to 3, the operating medium is a gas G, and in the example of FIG. 9 it is a liquid L.

FIGS. 4 to 7 illustrate respectively a further exemplary embodiment of an electromagnetic induction charging device 1 according to the disclosure in a section along the gravity direction S. It can be seen that the electromagnetic induction charging device 1 comprises for example power electronics 23. In these exemplary embodiments, the induction charging device 1 comprises in addition a recooler 24, with which the heat which is dissipated with the cover 7 from the resonator 11 and from the housing interior 8 can be emitted to the external environment 9. The recooler 24 therefore serves for the cooling of the operating medium F. In FIGS. 4 to 7, the cover 7 is flowed through by a secondary operating medium F2. The secondary operating medium F2 can be directed through the recooler 24, so that the operating medium F is able to be cooled with the secondary operating medium F2 and the recooler 24. The cover 7 can have a network of cavities which are suitable to direct the secondary operating medium F2 or respectively to circulate the latter within the cover 7. The secondary operating medium F2 is, for example, a liquid L, in particular a water-based liquid, typically an antifreeze-water solution. The network of the cavities is present within the cover 7. The network of the cavities within the cover 7 is typically connected to a conveying device, which makes it possible to circulate the secondary operating medium F2 in the network of the cavities. The secondary operating medium F2 can be a gas G or an, in particular, dielectric or electrically conductive liquid L. The secondary operating medium F2 can be a liquid L when the operating medium F is a gas G.

Figure 4:
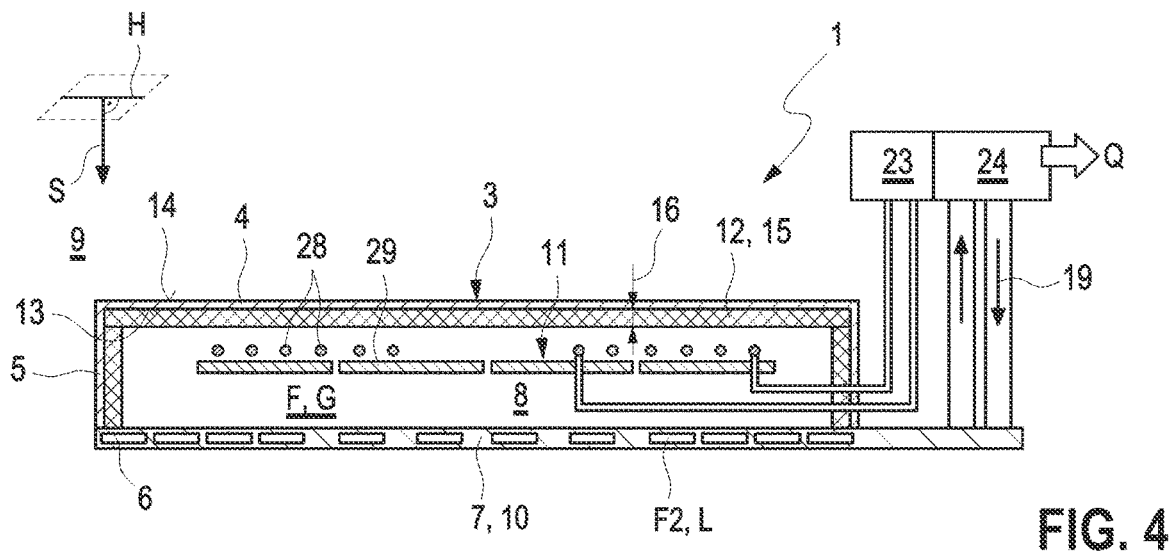

Here, according to the exemplary embodiment shown in FIG. 4, both the power electronics 23 and also the recooler 24 are arranged entirely outside the housing interior 8. In the exemplary embodiment shown in FIG. 5, in contrast, the power electronics 23 are arranged partially in the housing interior 8 and partially outside the housing interior 8, wherein the recooler 24 is present entirely outside the housing interior 8. In contrast thereto, according to the exemplary embodiment shown in FIG. 4, the power electronics 23 are arranged entirely in the housing interior 8 and the recooler 24 is arranged entirely outside the housing interior 8. In the exemplary embodiment shown in FIG. 7, again in contrast to exemplary embodiments shown in FIGS. 4 to 6, both the recooler 24 and also the power electronics 23 are arranged entirely in the housing interior 8. The components of the electromagnetic induction charging device 1 arranged according to FIGS. 4 to 6 outside the housing interior 8 can be fastened to a wall of a building.

Figure 5:
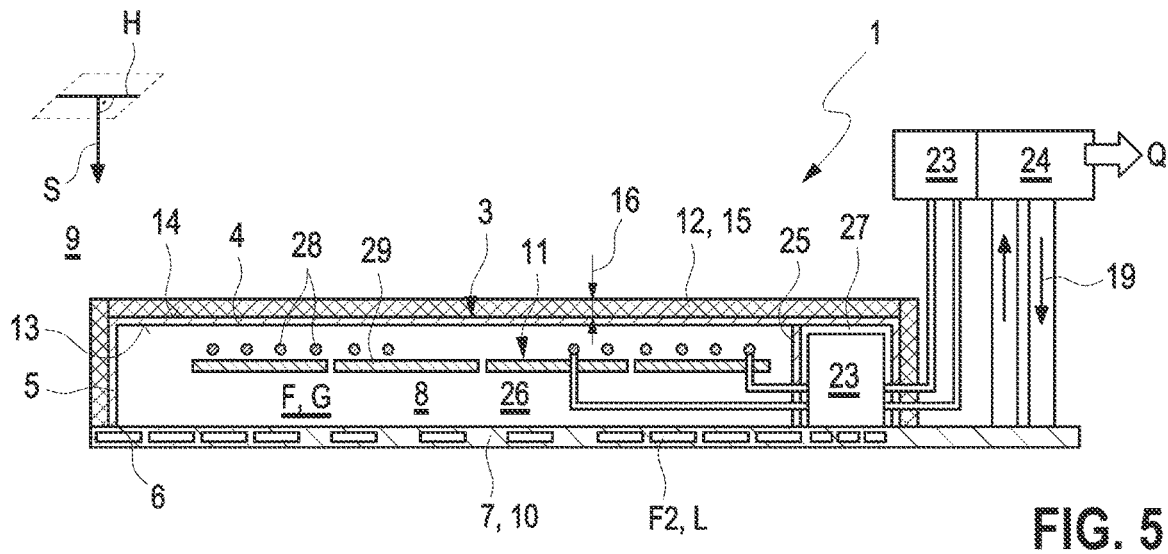
Figure 6:
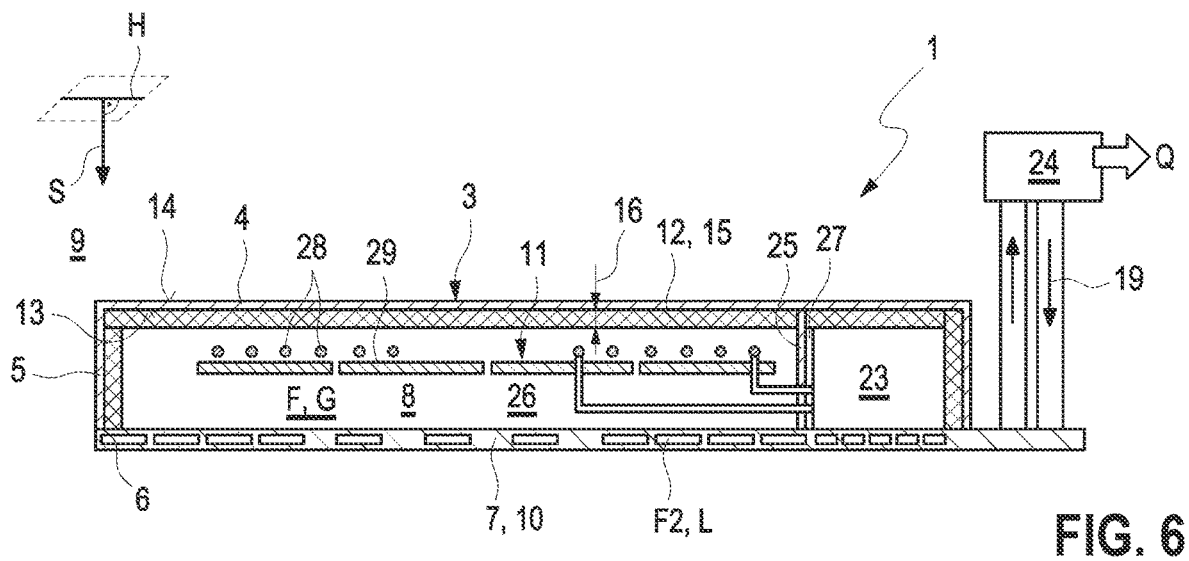
Figure 7:
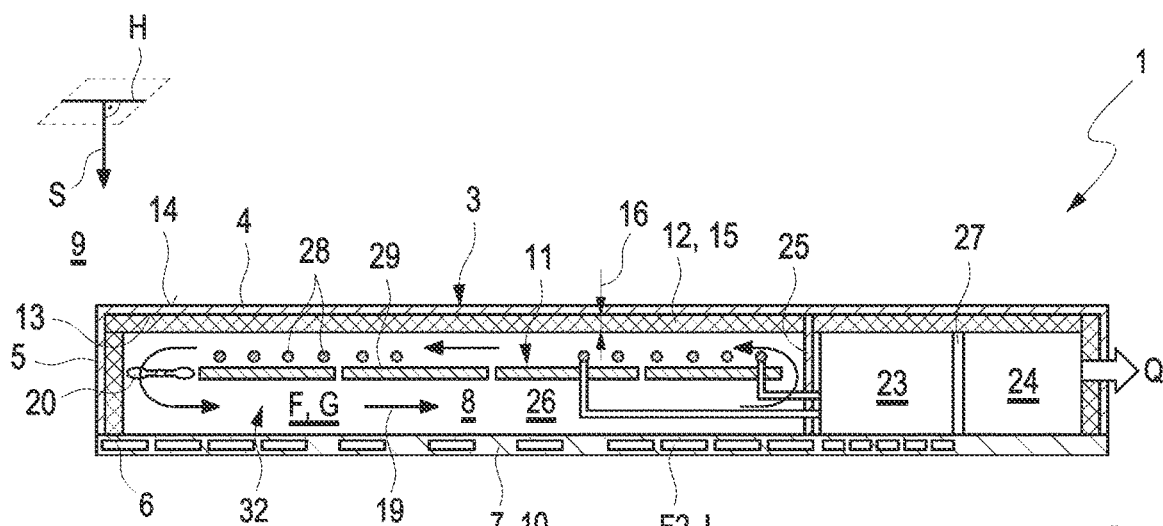

FIGS. 5 to 7 show that the housing 3 comprises for example a partition wall 25. This partition wall 25 divides the housing interior 8 into a first and a second compartment 26, 27. Here, in the first compartment 26 the resonator 11 is arranged, and in the second compartment 27 at least a portion of the power electronics 23, according to FIG. 6 and FIG. 7 the entire power electronics 23. In addition, in accordance with the example of FIG. 7, the recooler 24 can be present in the second compartment 27.

In accordance with FIGS. 1 to 9, the electromagnetic resonator 11 of the electromagnetic induction charging device 1 comprises an electromagnetic coil 28 and a magnetic field conductor 29. The electromagnetic coil 28 is wound for example in a flat manner substantially in a horizontal H. The horizontal H is a plane, the normal vector of which runs along the gravity direction S. The magnetic field conductor 28 can consist for example of ferrite.

According to FIG. 9, the thermal insulation 12 fills the housing interior 8 entirely, for example. Here, the housing interior 8 is entirely filled with the thermal insulation 12 such that the remaining components of the induction charging device 1 which are arranged in the housing interior 8—therefore, in the exemplary embodiment shown in FIG. 9, the resonator 11 with the coil 28 and with the magnetic field conductor 29 and the second cooling channel 21—are embedded in the thermal insulation 12.

Such an embedding of at least individual items of components of the induction charging device 1 present in the housing interior 8 is, furthermore, also shown in FIG. 8. Accordingly, the coil 28 and the magnetic field conductor 29 are embedded in the insulation 12, wherein the housing interior 8 is not, however, entirely filled by the thermal insulation 12.

The electric induction charging device 1 according to the disclosure is set up, as illustrated for example in FIG. 1, for mounting on a substrate 30, which can be travelled on by the motor vehicle 2 which is to be charged. Here, the cover 7 in the operating position shown in FIG. 1 is arranged beneath the housing 3. The induction charging device touches the substrate 30 for example exclusively with the cover 7.

It is understood that the foregoing description is that of the exemplary embodiments of the disclosure and that various changes and modifications may be made thereto without departing from the spirit and scope of the disclosure as defined in the appended claims.

What is claimed is:

1. An electromagnetic induction charging device for an inductive, in particular contactless, charging of an at least partially electrified motor vehicle with electrical energy, the electromagnetic induction charging device comprising:
    a housing, formed in a pot-like manner, which comprises a pot base and a pot collar, wherein the pot collar, facing away from the pot base, surrounds a pot opening;
    a thermally conductive cover, which covers the pot opening such that, together with the housing, it delimits a housing interior;
    an electromagnetic resonator, arranged in the housing interior, for the inductive transmitting of electrical energy to the motor vehicle,
    wherein the housing comprises a thermal insulation which is arranged at the pot collar and at the pot base for the thermal insulating of the housing interior with respect to the external environment.

2. The electromagnetic induction charging device according to claim 1, wherein the cover closes the pot opening in a fluid-tight manner and forms a heat bridge which thermally connects the housing interior with the external environment.

3. The electromagnetic induction charging device according to claim 1, wherein the cover is formed as a cooling plate.

4. The electromagnetic induction charging device according to claim 1, wherein the thermal insulation is arranged on an inner side of the housing facing the housing interior.

5. The electromagnetic induction charging device according to claim 1, wherein the thermal insulation is arranged on an outer side of the housing facing the external environment.

6. The electromagnetic induction charging device according to claim 1, wherein:
the thermal insulation is formed as an insulation layer with a layer thick-ness of 1 mm to 5 mm, and
the insulation layer encloses or/and lines the housing, in particular over the entire surface.

7. The electromagnetic induction charging device according to claim 1, wherein the housing comprises a housing inner skin and a housing outer skin, between which the insulation is arranged in a sandwich-like manner.

8. The electromagnetic induction charging device according to claim 1, wherein:
the thermal conductivity of the thermal insulation is a maximum of 0.04 W/(m*K), and/or
the thermal conductivity of the cover is at least 20 W/(m*K).

9. The electromagnetic induction charging device according to claim 1, wherein:
an insulation material of the thermal insulation is electrically insulating, in particular glass wool and/or rock wool and/or foam glass and/or calcium silicate and/or expanded clay and/or perlite, and/or
a cover material of the cover is electrically conductive, in particular aluminium and/or copper and/or steel.

10. The electromagnetic induction charging device according to claim 1, wherein:
the housing interior can be flowed through by an operating medium, such that heat can be transmitted from the resonator to the cover by convection, and/or
for the transport of heat from the resonator via the cover into the external environment, the housing interior forms a closed circulation path, partially delimited by the resonator, along which the operating medium circulates or can circulate.

11. The electromagnetic induction charging device according to claim 10, wherein the resonator is arranged in the circulation path such that it is entirely surrounded thereby.

12. The electromagnetic induction charging device according to claim 10, wherein in the housing interior a conveying device is present, with which a circulation of the operating medium can be brought about for the generating of a forced convection.

13. The electromagnetic induction charging device according to claim 10, wherein:
in the housing interior at least a first cooling channel which can be flowed through by the operating medium or by a secondary operating medium different from the operating medium, is present, which is thermally coupled to the resonator for the transmission of heat between resonator and operating medium or secondary operating medium, and/or
in the cover at least a second cooling channel is present which can be flowed through by the operating medium or by the secondary operating medium.

14. The electromagnetic induction charging device according to claim 13, wherein:
the operating medium is a gas, in particular air, or
the operating medium or the secondary operating medium is an, in particular dielectric or electrically conductive, liquid, or
the operating medium is a gas and the secondary operating medium is an, in particular dielectric or electrically conductive, liquid.

15. The electromagnetic induction charging device according to claim 1, wherein the electromagnetic induction charging device comprises power electronics which are typically arranged outside the housing interior or partially in the housing interior, most typically entirely outside or entirely inside the housing interior.

16. The electromagnetic induction charging device according to claim 1, wherein the electromagnetic induction charging device comprises a recooler which is typically arranged outside or at least partially in the housing interior, most typically entirely outside or entirely inside the housing interior.

17. The electromagnetic induction charging device according to claim 1, wherein the thermal insulation entirely fills the housing interior, such that the remaining components which are arranged in the housing interior are embedded in the thermal insulation.

18. The electromagnetic induction charging device according to claim 1, wherein:
the electromagnetic induction charging device is set up for mounting on a substrate which is able to be travelled on by the motor vehicle which is to be charged, and
in the operating position of the induction charging device, the cover is arranged in gravity direction beneath the housing, and the induction charging device touches the substrate, typically exclusively, with the cover.

* * * * *